(12) United States Patent
Van Blokland

(10) Patent No.: US 10,219,520 B2
(45) Date of Patent: Mar. 5, 2019

(54) DOUGH LINE FOR PROCESSING DOUGH

(71) Applicant: Radie B.V., Culemborg (NL)

(72) Inventor: Johannes Josephus Antonius Van Blokland, Laren (NL)

(73) Assignee: Radie B.V., Culemborg (NL)

( * ) Notice: Subject to any disclaimer, the term of this patent is extended or adjusted under 35 U.S.C. 154(b) by 254 days.

(21) Appl. No.: 15/265,068

(22) Filed: Sep. 14, 2016

(65) Prior Publication Data

US 2017/0079283 A1    Mar. 23, 2017

(30) Foreign Application Priority Data

Sep. 22, 2015   (EP) .................................... 15186186

(51) Int. Cl.
| | |
|---|---|
| *A21C 9/04* | (2006.01) |
| *A21C 9/08* | (2006.01) |
| *B05C 5/02* | (2006.01) |
| *G05D 7/06* | (2006.01) |
| *B05C 19/06* | (2006.01) |
| *B05C 19/04* | (2006.01) |

(52) U.S. Cl.
CPC .................. *A21C 9/04* (2013.01); *A21C 9/08* (2013.01); *B05C 5/0245* (2013.01); *B05C 19/04* (2013.01); *B05C 19/06* (2013.01); *G05D 7/0676* (2013.01)

(58) Field of Classification Search
CPC .......... A21C 9/04; A21C 9/08; A23G 3/0097; A23G 3/0085; A23G 3/28; A23G 3/2076; A21D 13/22; B05C 5/0245; B05C 19/04; B05C 19/06; G05D 7/0676; B05B 7/144

USPC .............. 118/679, 13, 308; 426/289; 99/494
See application file for complete search history.

(56) References Cited

U.S. PATENT DOCUMENTS

| | | | | |
|---|---|---|---|---|
| 2,142,373 | A * | 1/1939 | Plambeck ................ | A21C 9/04 118/25 |
| 5,078,090 | A * | 1/1992 | Richman .................. | A21C 9/04 118/13 |
| 6,129,037 | A | 10/2000 | Watts | |
| 6,237,473 | B1 * | 5/2001 | Morikawa ................ | A21C 3/02 198/345.1 |

FOREIGN PATENT DOCUMENTS

| | | |
|---|---|---|
| CA | 2 690 423 A1 | 7/2011 |
| WO | WO 2010/062172 A1 | 6/2010 |

* cited by examiner

*Primary Examiner* — Laura Edwards
(74) *Attorney, Agent, or Firm* — Varnum, Riddering, Schmidt & Howlett LLP

(57) ABSTRACT

The present specification relates to a dough line for processing dough, specifically sheeted dough, having a conveyor, for conveying the dough, a sensor, for detecting the beginning of a dough piece at a detection point in the dough line, a controllable flour sifter, arranged above the conveyor, for depositing flour on the conveyor or on dough on the conveyor, a controller, for controlling the amount of flour deposited by the flour sifter based on the sensor signal, wherein the controller is configured for disabling the flour sifter when there is no dough piece on or to be placed on the conveyor at the location of the flour sifter, enabling the flour sifter to deposit a first amount of flour per amount of displacement of the conveyor when there is a dough piece on or to be placed on the conveyor at the location of the flour sifter.

6 Claims, 1 Drawing Sheet

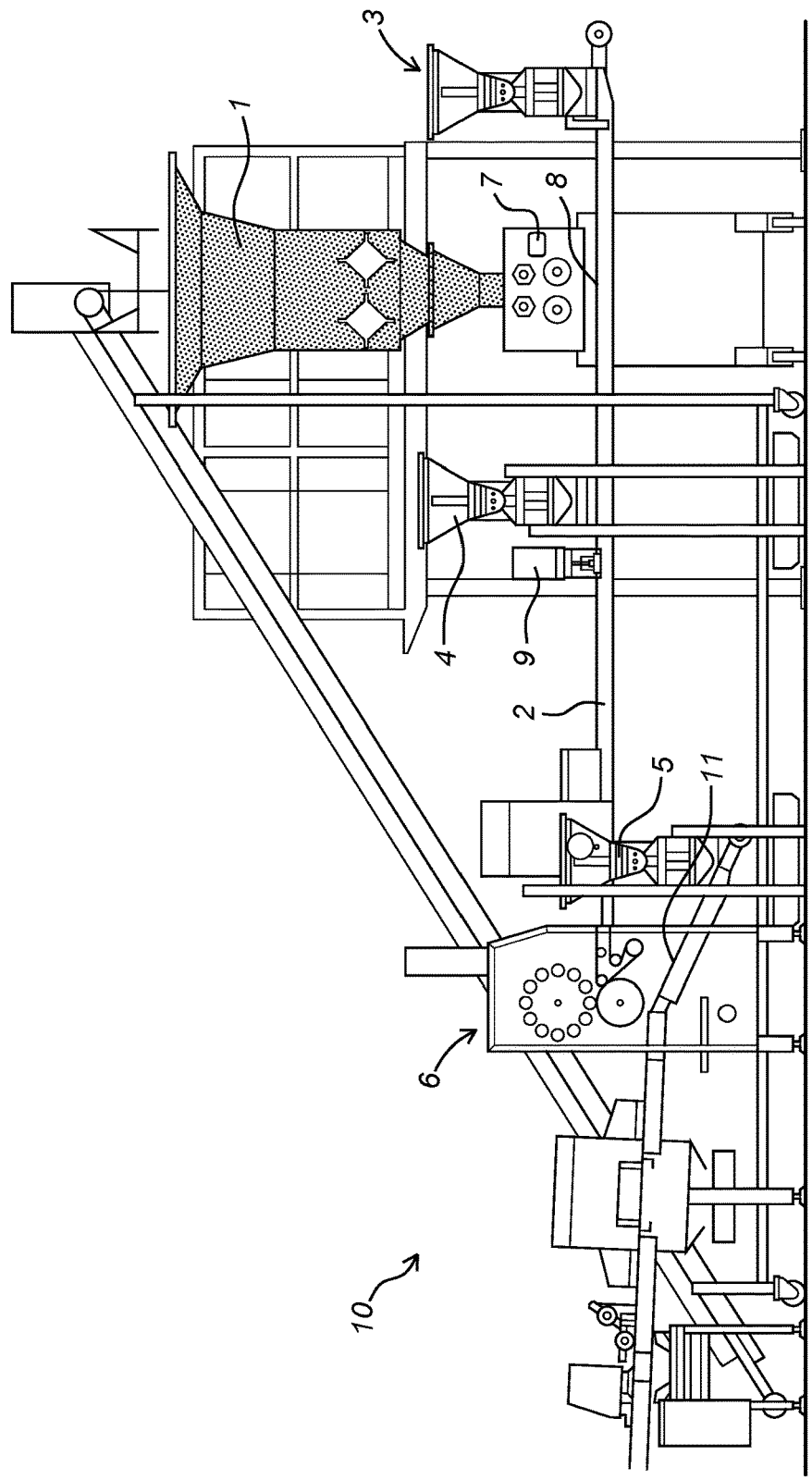

DOUGH LINE FOR PROCESSING DOUGH

TECHNICAL FIELD

The present specification relates to a dough line for processing dough, in particular sheeted dough.

BACKGROUND

Dough lines are known in the art and are formed by several dough processing stages along which dough is conveyed. The conveyor may be built up from several sequential conveyor belts, rolls and other items that engage the dough.

It is a known problem that dough sticks to the conveyor, rolls and/or other parts it comes in touch with, and it is also known that this problem can be solved by providing a layer of flour in between the dough and the part it comes in contact with.

In a process where sheeted dough is used, the dough pieces are very long, and sometimes the process is even continuous. Here, the dough is normally put in a funnel, and then formed to a sheet by multiple pairs of rolls, or any type of laminator. When the funnel is filled before it is empty the dough sheet is endless. Nevertheless, from time to time a new batch of dough is started and it has appeared to that such new dough piece gives the most problems of sticking in the dough line.

Normally, the amount of flour to be used to avoid sticking is determined experimentally, and set to a value or level where no sticking problems occurs. However, a first aspect of the present specification is the insight that such mode of operating the dough line leads to a setting wherein in the average, too much flour is applied to the dough and/or conveyor, since it is mainly the beginning of a new dough sheet that has sticking problems. Once a dough piece follows its intended path through the dough line, the sheet is coherent enough to stick to itself and has less tendency to stick to the conveyor, rolls or other parts of the dough line.

It is therefore a goal of the present specification to provide a solution for dough unintendedly sticking onto the dough line, and more in particular to provide a solution that avoids the use of too much flour.

SUMMARY

The specification thereto proposes a dough line for processing dough, in particular sheeted dough, comprising a conveyor, for conveying the dough along dough processing stages, a sensor, for detecting the beginning of a dough piece at a detection point in the dough line, a controllable flour sifter, arranged above the conveyor, for depositing flour on the conveyor or on dough on the conveyor, a controller, for controlling the amount of flour deposited by the flour sifter based on the sensor signal, wherein the controller is configured for disabling the flour sifter when there is no dough piece on or to be placed on the conveyor at the location of the flour sifter, enabling the flour sifter to deposit a first amount of flour per amount of displacement of the conveyor when there is a dough piece on or to be placed on the conveyor at the location of the flour sifter wherein the controller is further configured for temporarily switching the amount of flour dispensed by the flour sifter to a second, higher than the first, amount of flour per amount of displacement of the conveyor during a predetermined distance from where the beginning of a dough piece is on or to be placed on the conveyor.

The sensor may be a photo cell which determines a colour difference between the conveyor and the dough, but also a weighing section, a photo cell in the or near the funnel, or a dough in- or output roll with a detector. The phrasing on or to be placed on refers the fact that flour may be applicable both on the conveyor as on the dough sheet on the conveyor, so on both sides. By only temporarily switching the amount of flour dispensed by the flour sifter to a second, higher than the first, amount of flour per amount of displacement of the conveyor during a predetermined distance from where the beginning of a dough piece is on or to be placed on the conveyor, extra flour is only used if and where it is necessary. This has the advantage of a reduced waste of flour, and also to a more consistent dough composition, since flour added by the sifters in the end arrives in the final product.

In general, the second amount may be between 10 and 30 and in particular about 20 percent higher than the first amount, and the predetermined distance is between 20 cm and 2 meter, and in particular about 1 meter.

The dough line according to the specification may comprise multiple controllable flour sifters, arranged at different locations above the conveyor, wherein the controller is configured for disabling each flour sifter when there is no dough piece on or to be placed on the conveyor at the location of said flour sifter, enabling each flour sifter to deposit a first amount of flour per amount of displacement of the conveyor when there is a dough piece on or to be placed on the conveyor at the location of said flour sifter and temporarily switching the amount of flour dispensed by said flour sifter to a second, higher than the first, amount of flour per amount of displacement of the conveyor during a predetermined distance from where the beginning of a dough piece is on or to be placed on the conveyor.

In other words, when the beginning of a dough sheet arrives at a sifter along the dough line, during a first interval, an extra amount of flour is applied. The sifters are in such case normally placed at locations where there is a higher risk of sticking, for instance at transitions from one conveyor belt to another or when the dough engages a roll or other part of a dough processing stage.

In a preferred embodiment the controller is configured to calculate the beginning of a new sheeted dough piece at locations of flour sifters in the dough line, based on one detected position by the sensor and a known speed and distance of the conveyor. This embodiment has the advantage that a minimum of sensors is required, which saves components and reduces the risk of failures due to mal functioning sensors.

However, as an alternative, a dough line according to the specification may comprise multiple sensors, each for detecting the beginning of a new sheeted dough piece at respective detection point in the dough line. This embodiment may be preferred when the dough position with respect to the conveyor tends to shift along the dough line, so that a calculated position becomes less reliable at a larger distance from the sensor.

BRIEF DESCRIPTION OF THE DRAWINGS

The specification will now be elucidated into more detail with reference to FIG. 1.

FIG. 1 shows a dough line according to the present specification.

DETAILED DESCRIPTION

FIG. 1 shows a dough line 10 according to the present specification. The dough line comprises a funnel wherein dough is put to be laminated, before it is deposited on a conveyor 2 for conveying the dough along dough processing stages. At the end of the dough sheet former, a sensor 7 is present for detecting the beginning of a dough piece, before it reaches the conveyor 2 at point 8. Arranged above the conveyor 2 is a first controllable flour sifter 3 for depositing flour on the conveyor. The sifter 3 deposits the flour upstream point 8 on the conveyor, so that it prevents the dough to stick to the conveyor. A second controllable flour sifter 4 is arranged downstream point 8, for depositing flour on dough on the conveyor 2, before it reaches a dough processing stage 9.

A non-depicted controller is present for controlling the amount of flour deposited by the flour sifters 3 and 4 based on the sensor signal from sensor 7, wherein the controller is configured for disabling the flour sifters 4, 3 respectively when there is no dough piece on or to be placed on the conveyor at the location of the flour sifter, and enabling the flour sifters 4, 3 to deposit a first amount of flour per amount of displacement of the conveyor when there is a dough piece on or to be placed on the conveyor at the location of the flour sifters 4, 3 and temporarily switching the amount of flour dispensed by the flour sifter to a second, higher than the first, amount of flour per amount of displacement of the conveyor during a predetermined distance from where the beginning of a dough piece is on or to be placed on the conveyor 2.

Further downstream the dough line 10 yet another flour sifter 5 is present, for delivering flour to conveyor belt 11 where the dough is delivered to after processing stage 6.

The above example serves as an example only and does not limit the scope of protection of the present application, as defined in the following claims.

The invention claimed is:

1. A dough line for processing dough, comprising:
   a conveyor, for conveying the dough along dough processing stages;
   a sensor, for detecting the beginning of a dough piece at a detection point in the dough line;
   a controllable flour sifter, arranged above the conveyor, for depositing flour on the conveyor or on dough on the conveyor;
   a controller, for controlling the amount of flour deposited by the flour sifter based on the sensor signal;
   wherein the controller is configured for:
      disabling the flour sifter when there is no dough piece on or to be placed on the conveyor at the location of the flour sifter;
      enabling the flour sifter to deposit a first amount of flour per amount of displacement of the conveyor when there is a dough piece on or to be placed on the conveyor at the location of the flour sifter;
   characterized by:
      temporarily switching the amount of flour dispensed by the flour sifter to a second, higher than the first, amount of flour per amount of displacement of the conveyor during a predetermined distance from where the beginning of a dough piece is on or to be placed on the conveyor.

2. The dough line according to claim 1, wherein the second amount is between 10 and 30 percent higher than the first amount.

3. The dough line according to claim 1, wherein the predetermined distance is between 20 cm and 2 meter.

4. The dough line according to claim 1, comprising multiple controllable flour sifters, arranged at different locations above the conveyor, wherein the controller is configured for:
   disabling each flour sifter when there is no dough piece on or to be placed on the conveyor at the location of said flour sifter;
   enabling each flour sifter to deposit a first amount of flour per amount of displacement of the conveyor when there is a dough piece on or to be placed on the conveyor at the location of said flour sifter;
   characterized by:
   temporarily switching the amount of flour dispensed by said flour sifter to a second, higher than the first, amount of flour per amount of displacement of the conveyor during a predetermined distance from where the beginning of a dough piece is on or to be placed on the conveyor.

5. The dough line according to claim 4, wherein the controller is configured to calculate the beginning of a new sheeted dough piece at locations of flour sifters in the dough line, based on one detected position by the sensor and a predetermined speed and distance of the conveyor.

6. The dough line according to claim 4, comprising multiple sensors, each for detecting the beginning of a new sheeted dough piece at respective detection point in the dough line.

* * * * *